US007791488B2

(12) United States Patent
Bauchot et al.

(10) Patent No.: US 7,791,488 B2
(45) Date of Patent: Sep. 7, 2010

(54) CONNECTABLE ELECTRONIC COMPONENT COMPRISING A TRANSDUCER (75) Inventors: Frederic Bauchot, Saint-Jeannet (FR); Jean-Yves Clement, Saint-Jeannet (FR); Gerard Marmigere, Drap (FR); Joaquin Picon, Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/866,571

(22) Filed: Oct. 3, 2007

(65) Prior Publication Data
US 2008/0088458 A1 Apr. 17, 2008

(30) Foreign Application Priority Data
Oct. 12, 2006 (EP) .................................. 06301045

(51) Int. Cl.
*G08B 13/14* (2006.01)
(52) U.S. Cl. ...................... 340/572.8; 340/517; 340/525
(58) Field of Classification Search ... 340/572.1–572.9, 340/500, 502, 505, 506, 509, 517–525
See application file for complete search history.

(56) References Cited
U.S. PATENT DOCUMENTS

| | | | | |
|---|---|---|---|---|
| 4,811,545 A | * | 3/1989 | Oxman | 53/138.3 |
| 5,063,371 A | * | 11/1991 | Oyer et al. | 340/541 |
| 5,548,106 A | * | 8/1996 | Liang et al. | 235/454 |
| 6,335,686 B1 | * | 1/2002 | Goff et al. | 340/572.4 |
| 6,703,935 B1 | * | 3/2004 | Chung et al. | 340/572.7 |
| 6,903,656 B1 | * | 6/2005 | Lee | 340/572.1 |
| 6,909,366 B1 | * | 6/2005 | Marsh et al. | 340/505 |
| 7,053,775 B2 | * | 5/2006 | Moore | 340/572.1 |
| 7,084,769 B2 | * | 8/2006 | Bauer et al. | 340/572.7 |
| 2005/0178037 A1 | * | 8/2005 | Kunreuther | 40/674 |
| 2005/0258961 A1 | * | 11/2005 | Kimball et al. | 340/572.1 |

FOREIGN PATENT DOCUMENTS

EP            1 298 573 A2    4/2003

* cited by examiner

*Primary Examiner*—Davetta W Goins
*Assistant Examiner*—Edny Labbees
(74) *Attorney, Agent, or Firm*—Schmeiser, Olsen & Watts; William H. Steinberg

(57) ABSTRACT

A connectable electronic component comprising a transducer such as an RFID antenna, a status annunciator such as a short circuit to indicate the presence of the electronic component, and circuit means to propagate signals between the transducer, the status annunciator and an external control system, and circuit means to propagate signals between the external control system and other electronic components.

A control system adapted to control one or more of said electronic components, comprising sensing means adapted to generate an interrogation signal to detect the presence of any electronic component, a subsystem adapted to generate a control signal to control the transducer of a detected electronic component, and routing means.

20 Claims, 10 Drawing Sheets

CONNECTABLE ELECTRONIC COMPONENT COMPRISING A TRANSDUCER

CROSS REFERENCE TO RELATED PATENT APPLICATIONS

The present application claims priority under 35 U.S.C. 119 of French Patent Application No. 06301045.8, filed on Oct. 12, 2006.

FIELD OF THE INVENTION

The present invention relates to the design of electronic components, and more particularly to the design of connectable electronic components.

BACKGROUND OF THE INVENTION

As the use of electronic components increases dramatically, it is an important requirement to be able to manufacture cheap and flexible electronic components that can be adapted to a large variety of situations. For instance, to facilitate the localization of items in a library, RFID tags are attached to these items and are identified by arrays of RFID antennae. These antennae are controlled by a central system that, based on a tag id, can identify the antenna that is close to the requested RFID tag. Such a solution is disclosed in EP1298573, wherein the invention relates to RFID devices and to antenna systems for enabling RFID devices to interrogate items of interest that are near the antenna system.

With the multiplication of these electronic components, it is crucial to manufacture them at a low price. A common technique to manufacture cheap antennae is to use ink antennae. This technique also permits making a shape on a film, as is disclosed in EP1250727.

SUMMARY OF THE INVENTION

According to a first aspect of the present invention there is provided one or more electronic components wherein each electronic component comprises:
 transducer means;
 a status annunciator, adapted to indicate the presence of the electronic component in response to an externally originated interrogation signal;
 first circuit means configured to propagate signals between the transducer means and a first connection point;
 second circuit means, configured to propagate the interrogation signal between the status annunciator and a second connection point; and
 third circuit means configured to propagate signals between a set of third connection points and a set of fourth connection points, wherein the set of fourth connection points is adapted for connection to the corresponding first and second connection points and the set of third connection points of another electronic component.

One advantage of this aspect is that it allows cheap manufacturing of arrays of such electronic components. Another advantage is that the number of electronic components is flexible and can be easily changed, even after the system has been set up.

In a development of the first aspect, several electronic components have the same physical design.

An advantage is then that the component is cheaper to manufacture, and the electronic components are interchangeable.

In a further development of the first aspect, the transducer and the status annunciator of the electronic component are passive.

An advantage is that the electronic component is cheaper to manufacture than with active components.

In another development of the first aspect, the transducer is an RFID antenna.

An advantage of this aspect is that the invention can then be used to locate items that are in proximity of an electronic component. Another advantage is that the invention can be shaped so as to be close to the items to locate.

In yet another development of the first aspect, the status annunciator comprises a short circuit or a circuit comprising a visual indicator, such as a LED.

An advantage of the short circuit is that it is very cheap to manufacture. An advantage of the visual indicator is that one has a visual indication for which electronic component is in use.

In a yet further development of the first aspect, the electronic components can be assembled as a ribbon web member, or as a web member of pluggable elements.

An advantage is that the ribbon embodiment is very cheap to produce, whereas the pluggable embodiment is more flexible as elements can be plugged and unplugged dynamically.

In a further development of the first aspect, there is provided a control system for controlling one or several electronic components, the control system comprising:
 a set of fifth connection points adapted for connection to the first and second connection points and the set of third connection points of a first one of the electronic components;
 sensing means adapted to generate an interrogation signal to detect the presence of an electronic component as a function of an electrical property of the status annunciator associated with that electronic component;
 a subsystem adapted to generate a control signal for the transducer of such detected electronic component; and
 routing means adapted to route the interrogation and control signals to the fifth connection points corresponding to such detected electronic component.

An advantage of this system is that the connection means between the control system and the different electronic components are integrated in the electronic components, thus improving the compactness and the aesthetic of the system setup.

In a further development of the control system, the sensing means can simultaneously detect, the subsystem can simultaneously generate control signals, and the routing means can simultaneously send interrogation and control signals to several or all of the present electronic components.

In a further development of the control system, the subsystem is further adapted to analyze a received signal.

In a further development of the control system, the received signal is a response to said control signal.

An advantage is that such a system can control arrays of RFID antennae that return if there are any matching items in their proximity.

According to a second aspect of the present invention there is provided a method for controlling an electronic component in a web member, the electronic component including a transducer, a status annunciator and a set of connection points, wherein the method comprises the steps of:

generating an interrogation signal to detect the presence of the electronic component;

transmitting the interrogation signal to a connection point corresponding to the status annunciator of the electronic component whose presence is being determined;

determining the presence of the electronic component at the connection point as a function of an electrical property of a response by the status annunciator to the interrogation signal; and storing whether the electronic component is present at the connection point.

An advantage of this method is that it doesn't require any setup: electronic components can be added or removed dynamically, the method will pick them up automatically.

In a development of the second aspect, the method further comprises the steps of:

generating a control signal for the transducer; and transmitting the control signal to the connection point corresponding to the transducer of each electronic component determined as present.

In another development of the second aspect, the method further comprises the step of analyzing the response of the transducer to the control signal.

An advantage of this aspect is that the number of RFID antennae in controlled arrays can be dynamic.

According to a third aspect of the invention there is provided a system comprising: one or more electronic components, each electronic component comprising a transducer, a status annunciator and a set of connection points, wherein the connection points are adapted to propagate signals to the transducer and the status annunciator; and a computer program product comprising a computer usable medium including a computer readable program, wherein the computer readable program, when executed on a computer, causes the computer to:

generate an interrogation signal to detect the presence of at least one of the electronic components;

transmit the interrogation signal to a connection point corresponding to the status annunciator of the at least one electronic component whose presence is being determined;

determine the presence of at least one electronic component at the connection point as a function of an electrical property of a response by the status annunciator to the interrogation signal; and store whether the electronic component is present at the connection point.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION OF THE INVENTION

Other embodiments based on symmetry, rotation or any rearrangement of the described embodiments are meant to be incorporated herein.

Figure 1A:
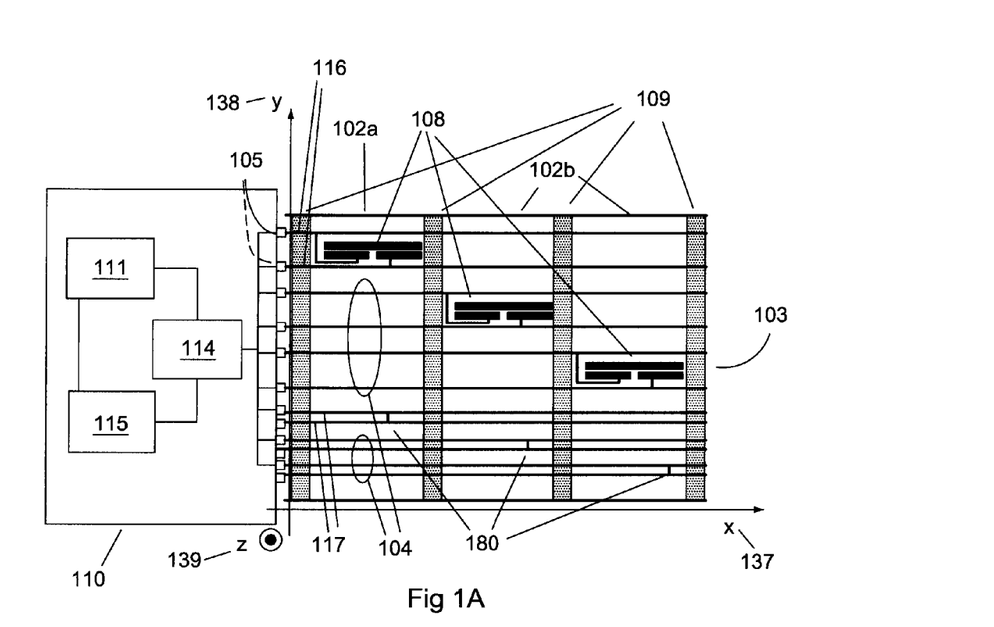
FIGS. 1A and 1B show the connection of a control system to a web member of three electronic components.

FIG. 1A shows the connection of a control system (110) to a ribbon web member (103) of three electronic components (102a) and (102b), according to a first embodiment.

Control system (110) determines the number of electronic components (102a) and (102b) present in web member (103), and controls the detected electronic components by sending a control signal to a set of transducers (108).

The following sections describe more in detail the web member and the control system.

I The Ribbon Web Member

Web member (103) can be implemented as a ribbon, with for example conductive ink being printed on a film. An example of such technique, suitable for implementation of the present invention, has been described in EP1250727.

A plurality of lines (109) form a demarcation between electronic components (102a) and (102b). Lines (109) can be cut to obtain web members with different numbers of electronic components, as it is shown in FIGS. 8A and 8B, and 9A and 9B.

Electronic components (102a) and (102b) and variants thereof will be further described with respect to FIGS. 3, 8A and 8B, 9A and 9B, and 10.

A The Electronic Components

Each electronic component comprises:

a transducer (108) that can be for example an RFID antenna, a status annunciator (180) that is used to determine the electronic component as present or absent, first circuit means (116) to propagate signals to the transducer, second circuit means (117) to propagate signals to a status annunciator (180), and third circuit means (104) to propagate signals through the electronic component.

Figure 8A:
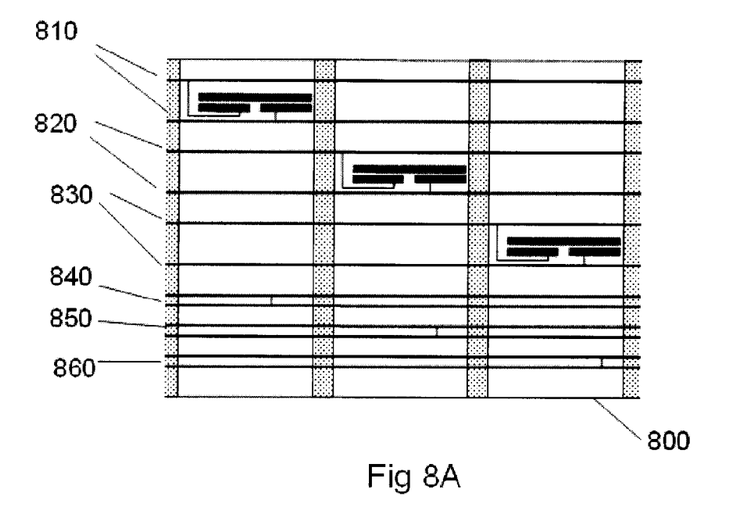
FIGS. 8A and 8B show two web members comprising three electronic components, cut from a ribbon at different locations.
Figure 8B:
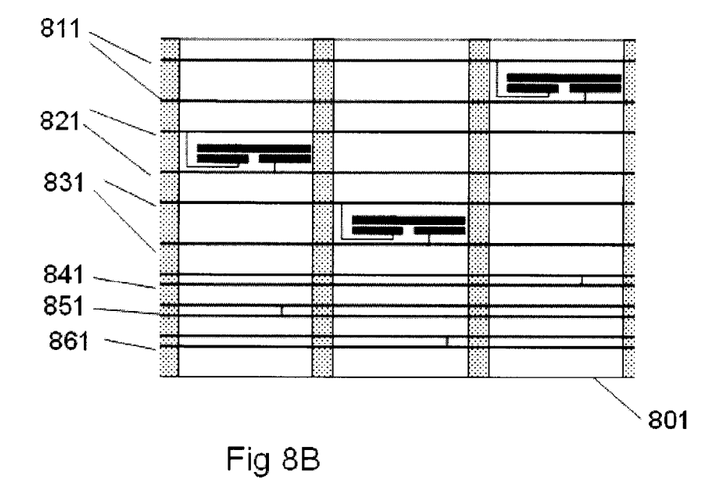

Electronic components (102a) and (102b) in web member (103) can have any order. FIGS. 8A and 8B show examples of how electronic components (102a) and (102b) can be interchanged. The layout described with respect to FIG. 1B, in which all the electronic components are identical, can also be applied in the present case of ribbon web member (103).

In this example, an orthogonal set of axes of coordinates (x,y,z) (137), (138), (139) is used. Web member (103) is represented in the plane (x,y) (137),(138) with the electronic components connected together along axis x (137). Web member (103) can be bent and take many different shapes as necessary to implement the invention.

In this example, web member (103) includes a maximum of three electronic components. Web member (103) is said to be modulo 3 as web members of maximum three electronic components can be obtained. It is possible to manufacture a ribbon allowing web members of any number of electronic components, as will be described with respect to FIGS. 7 and 10.

B The Transducer

Transducer (108) can be implemented in many different forms. It can be an actuator, a sensor or both. In the case of an RFID antenna, a dipolar antenna can be used as it is easy to print such antenna on a film. Those skilled in the art will be able to design dipolar antennas appropriately dimensioned in accordance with the frequency signal to be radiated.

Hereafter is a non exhaustive list of transducers that could comprise transducer (108):

Electrochemical: pH probe, electro-galvanic fuel cell
Electromechanical: electro active polymers, galvanometer, MEMS, motor, linear motor, potentiometer, strain gauge, switch
Electroacoustic: piezoelectric crystal, tactile transducer
Photoelectric: Laser diode, light-emitting diode, photo-diode, phototransistor, photomultiplier tube
Electromagnetic: antenna, RFID antenna, cathode ray tube, fluorescent lamp, light bulb, magnetic cartridge, photocell or light-dependent resistor, tape head, hall effect sensor
Electrostatic: electrometer, liquid crystal display (LCD)
Thermoelectric: thermocouple: Peltier cooler, thermistor (includes PTC resistor and NTC resistor)
Geiger-Müller tube.

Transducer (108) can also be passive, to keep the price and the complexity of the device low.

Figure 10:
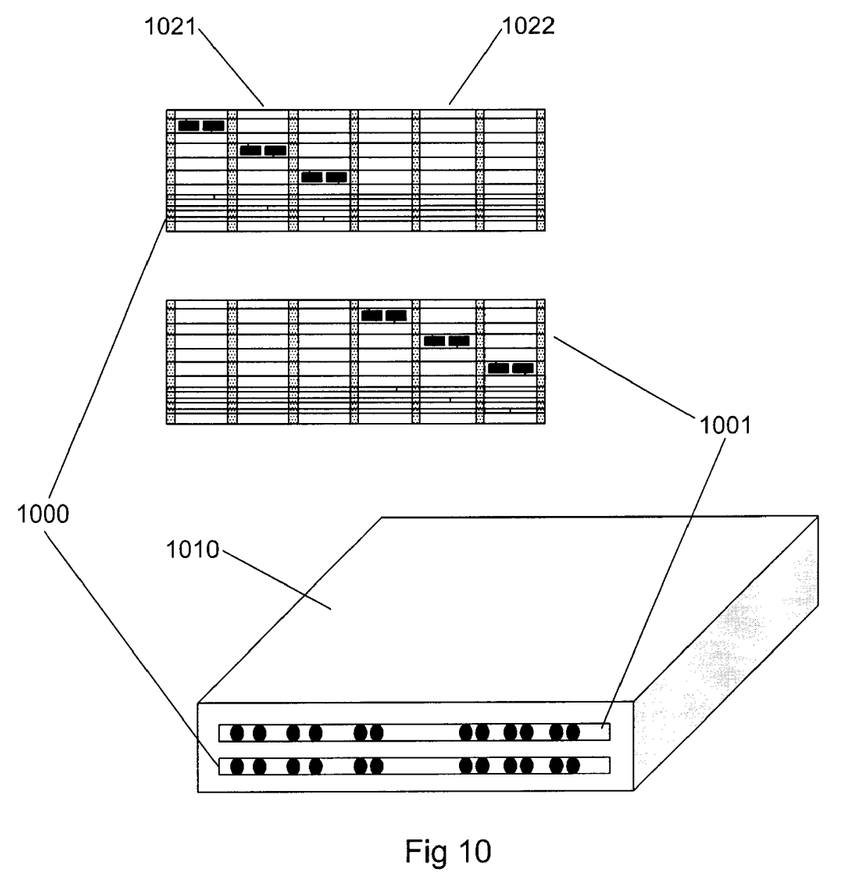
FIG. 10 show a particular implementation of a web member of electronic components, adapted to extend the number of maximum transducers by combining two of said web members.

In some implementations, transducer (108) can be directional. In the implementation of FIG. 1A, the transducer direction is parallel to axis y (138). Thus, the arrangement of electronic components along axis x (137) in web member (103) creates an array of directional transducers (102a) (102b) in one main direction y (138). To extend the length of the zone along axis x (137) covered by web member (103), it is possible to increase the numbers of transducers (108), as described below with respect to FIGS. 7, 10A and 10B.

C The Circuit Means

First circuit means (116) propagate signals between transducer (108) of first electronic component (102a) and a connection point (105). Second circuit means (117) propagate signals between status annunciator (180) of first electronic component (102a) and another connection point (105). Third circuit means (104) propagate signals so as to extend the connectivity to the other electronic components (102b) of web member (103).

D The Status Annunciator

There is one or more status annunciator (180) per each electronic component (102a), (102b). The presence of electronic component (102a), (102b) is determined by status annunciator (180).

For instance, when a voltage is applied to wires (117), if an open circuit is not detected, then status annunciator (180) for this wire is present, thus transducer (108) at wires (116) is present as well. The case when an open circuit is detected is described in more detail with respect to FIGS. 9A and 9B.

Another implementation would measure the impedance of line (117) to check for the presence of status annunciator (180).

II The Control System

Control system (110) is connected to web member (103) via connection points (105). First electronic component (102a) in web member (103) extends the connectivity from the other electronic components (102b) in web member (103) to control system (110).

Control system (110) further comprises the following components:

a sensing component (111), that generates an interrogation signal to detect the presence of any electronic components (102a) and (102b) in web member (103).

a subsystem (115) that can generate a signal to control transducer (108), can transmit signal to the transducer of any electronic component thus detected, and can analyze a received signal from the electronic component transducer.

a routing means (114) adapted to route the interrogation signal from sensing component (111) to connection points (105) corresponding to status annunciator (180) of an electronic component to be detected, and the control signal from subsystem (115) to transducer (108) of a detected electronic component.

In a preferred implementation, routing means (114) first receive an interrogation signal from sensing component (111) along with the number 'n' of electronic component to be interrogated. Routing means (114) determine, based on this number 'n', connection points (105) corresponding to status annunciator (180) of the nth electronic component. For example, if the interrogation signal is for the first electronic component, it will be routed to second circuit means (117). The control signal from subsystem (115) is routed in the same manner to connection point (105) corresponding to the requested nth electronic component. Thus, in the case of a control signal sent to transducer (108) of first electronic component (102a), the signal would be routed to circuit means (116).

The presence of the electronic component is a function of an electrical property of status annunciator (180) of the electronic component being interrogated. Thus, if for example an open circuit is detected, then the corresponding electronic component is set as missing by sensing component (111). If status annunciator (180) indicates the corresponding electronic component as present, then sensing component (111) passes this information to subsystem (115), the latter will then be able to control transducer (108) of the corresponding electronic component.

Transducer (108) characteristics greatly impact the design of subsystem (115). Thus, for example, to implement an RFID reader, using subsystem (115) and transducer (108) implemented as an RFID antenna, the signal generated by subsystem (115) and the antenna characteristics must match. Those skilled in the art will know how to adapt subsystem (115) and transducer (108) so that they can work together correctly.

Figure 1B:
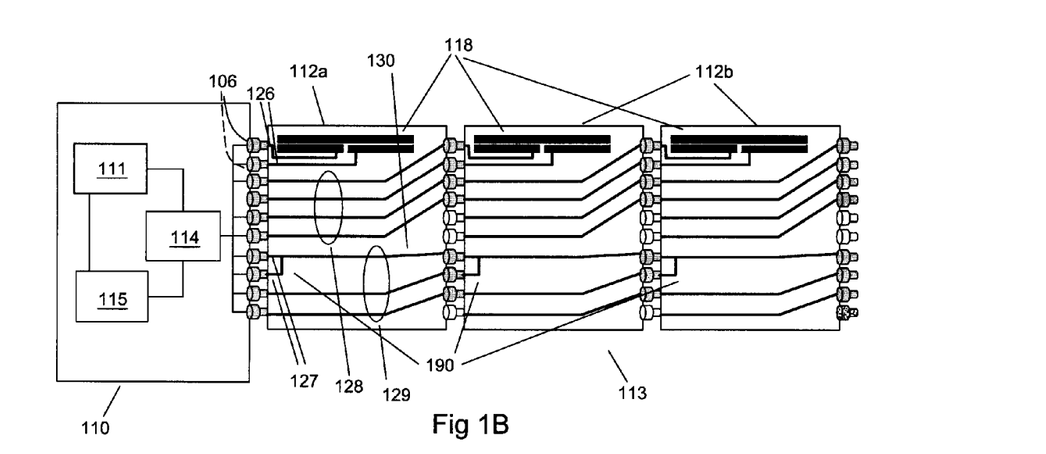

FIG. 1B shows the connection of control system (110) to a pluggable web member (113) of three identical electronic components (112a) and (112b), according to a second embodiment of the invention. Web member (113) is connected to control system (110) via connection points (106) made for example of plugs and sockets.

The second embodiment of the invention is very similar to the first embodiment described with respect to FIG. 1A. The following description will briefly address the elements that are similar to the first embodiment and the differences between the embodiments.

I The Pluggable Web Member

Pluggable web member (113) represented in FIG. 1B comprises three pluggable electronic components (112a) and (112b) connected together with plugs and sockets similar to the ones (106) between first electronic component (112a) and the control system (110).

A The Pluggable Electronic Components

Electronic components (112a) and (112b) can be packaged in a hard box to protect their content from physical damage or implemented with the same technique described with respect to FIG. 1A, with ink being printed on a film.

Figure 5:
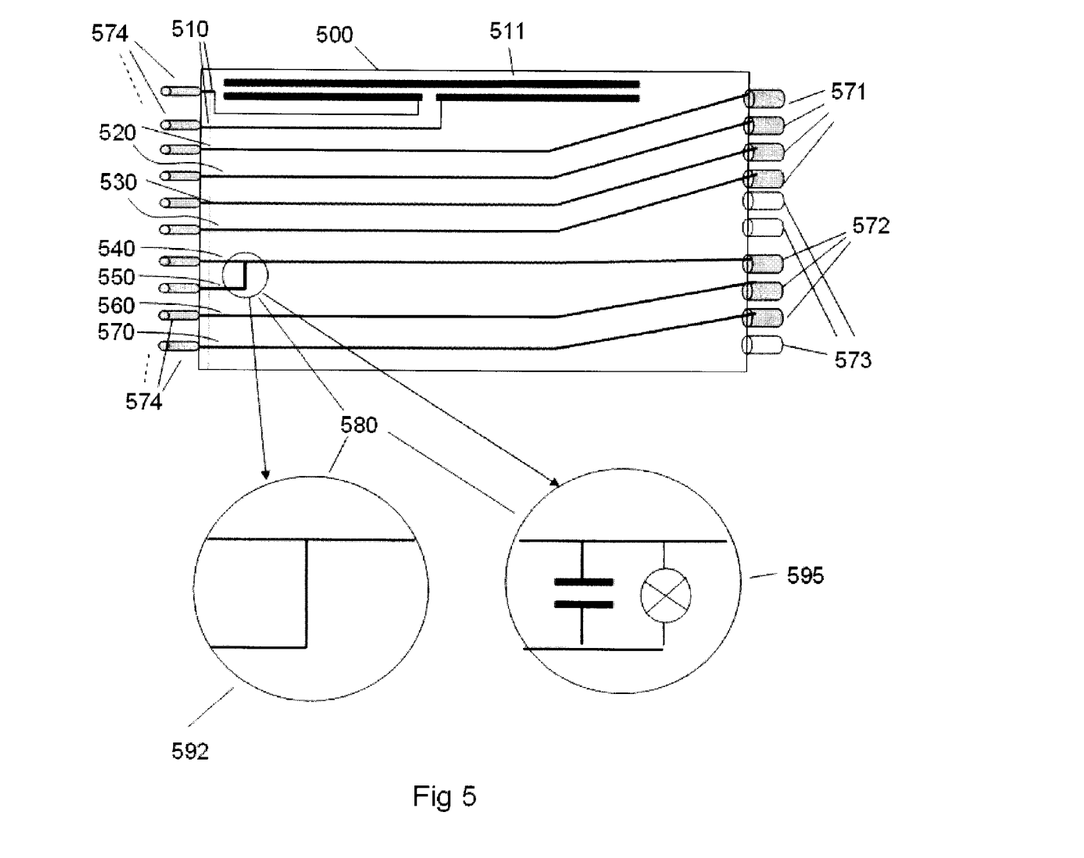
FIG. 5 shows an implementation as a pluggable component of an electronic component assembly, along with two different variants of a status annunciator.
Figure 6:
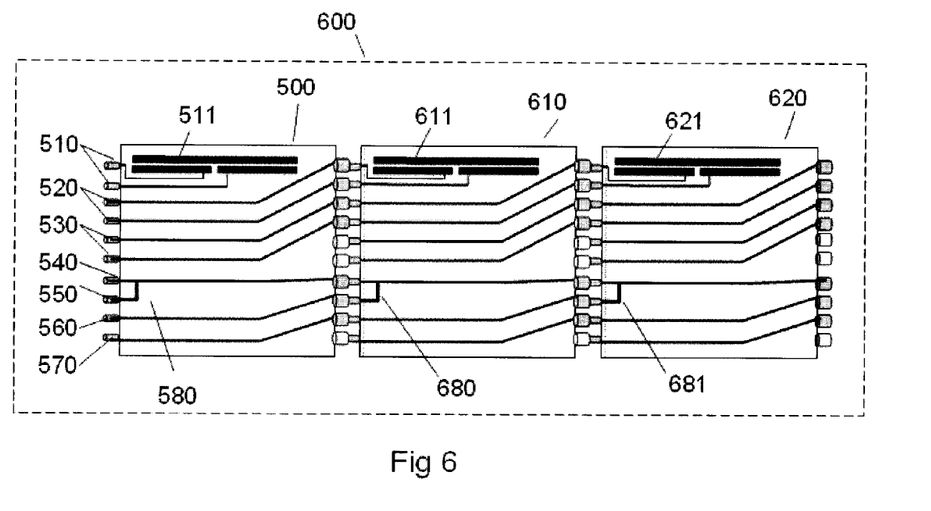
FIG. 6 shows a web member of pluggable identical electronic components.
Figure 7:
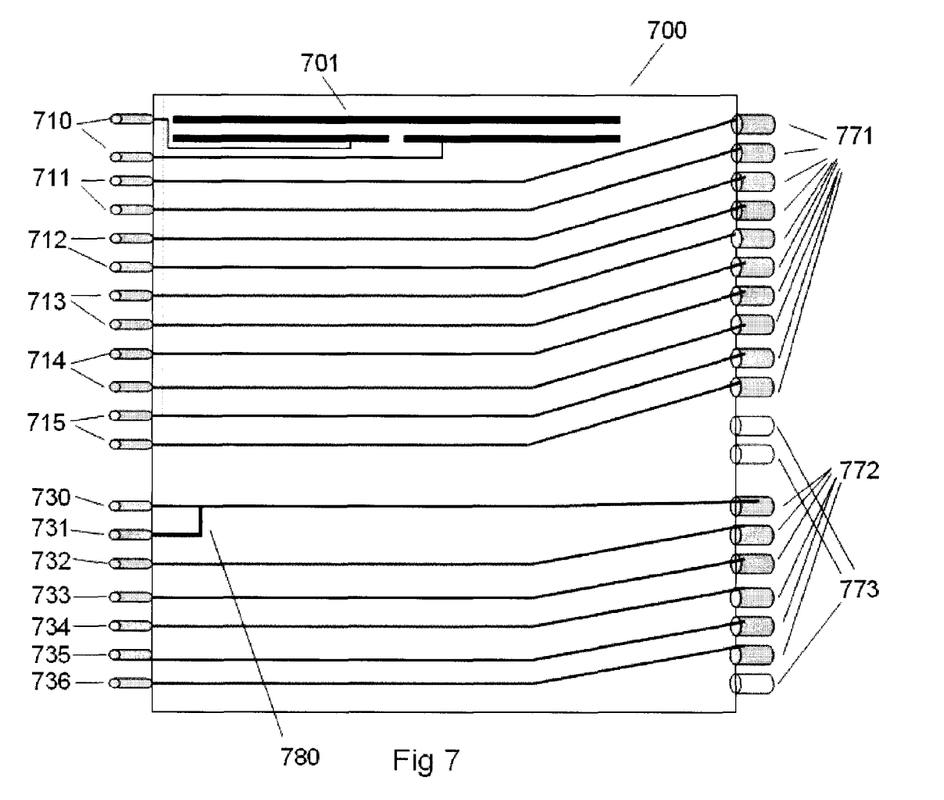
FIG. 7 shows a pluggable electronic component that can be part of a web member of six identical electronic components.

Electronic components (112a) and (112b) and different implementations according to the second embodiment will be further described with respect to FIGS. 5, 6 and 7.

Each pluggable electronic component comprises:
- a transducer (118), which has the same design, functionality and alternatives as transducer (108) of FIG. 1A,
- a status annunciator (190), which has the same design, functionality and alternatives as status annunciator 180 of FIG. 1A,
- a first circuit means (126) to propagate signals to transducer (118), with a different layout than first circuit means (116) as represented in FIG. 1A,
- a second circuit means (127) to propagate signals to status annunciator (190), with a different layout than second circuit means (117) as represented in FIG. 1A,
- third and fourth circuit means (128) and (129), respectively, to propagate signals through the electronic component, with a different layout than third circuit means (104) as represented in FIG. 1A.

As in the case of ribbon web member (103) as described with respect to FIG. 1A, with the implementation of FIG. 1B, the maximum number of electronic components (112a) (112b) that can be plugged together to form a web member is 3. It is possible to implement a pluggable web member with more than 3 elements. FIG. 7 represents an implementation of an electronic component modulo 6, according to the second embodiment.

B The Circuit Means

Circuit means (126), (127), (128) and (129) are designed so that pluggable electronic components (112a), (112b) are all identical, and thus can be plugged in any particular order.

First circuit means (126) propagate signals between transducer (118) of first electronic component (112a) and connection point (106). Second circuit means (127) propagate signals between status annunciator (190) of first electronic component (112a) and another connection point (106). Third circuit means (128) propagate signals so as to extend the connectivity to transducers (118) of the other electronic components (112b) of web member (113).

Wire (130) is a common wire used for fourth circuit means (129) to propagate signals to status annunciators (190).

The layout of the circuit means (126), (127), (128), (129) can be the same as for the electronic component (102a) in FIG. 1A. This layout can also be applied to the electronic component (112a) and (112b) in FIG. 1B.

II The Control System

Control system (110) is connected to web member (113) via connection points (106). First electronic component (112a) in web member (113) extends the connectivity from other electronic components (112b) in the web member to the control system.

Control system (110) subcomponents (111), (114) and (115) are the same as in FIG. 1A.

In this example, a web member (113) includes a maximum of three electronic components. Web member (113) is said to be modulo 3 as web members of maximum three electronic components can be obtained.

Figure 2:
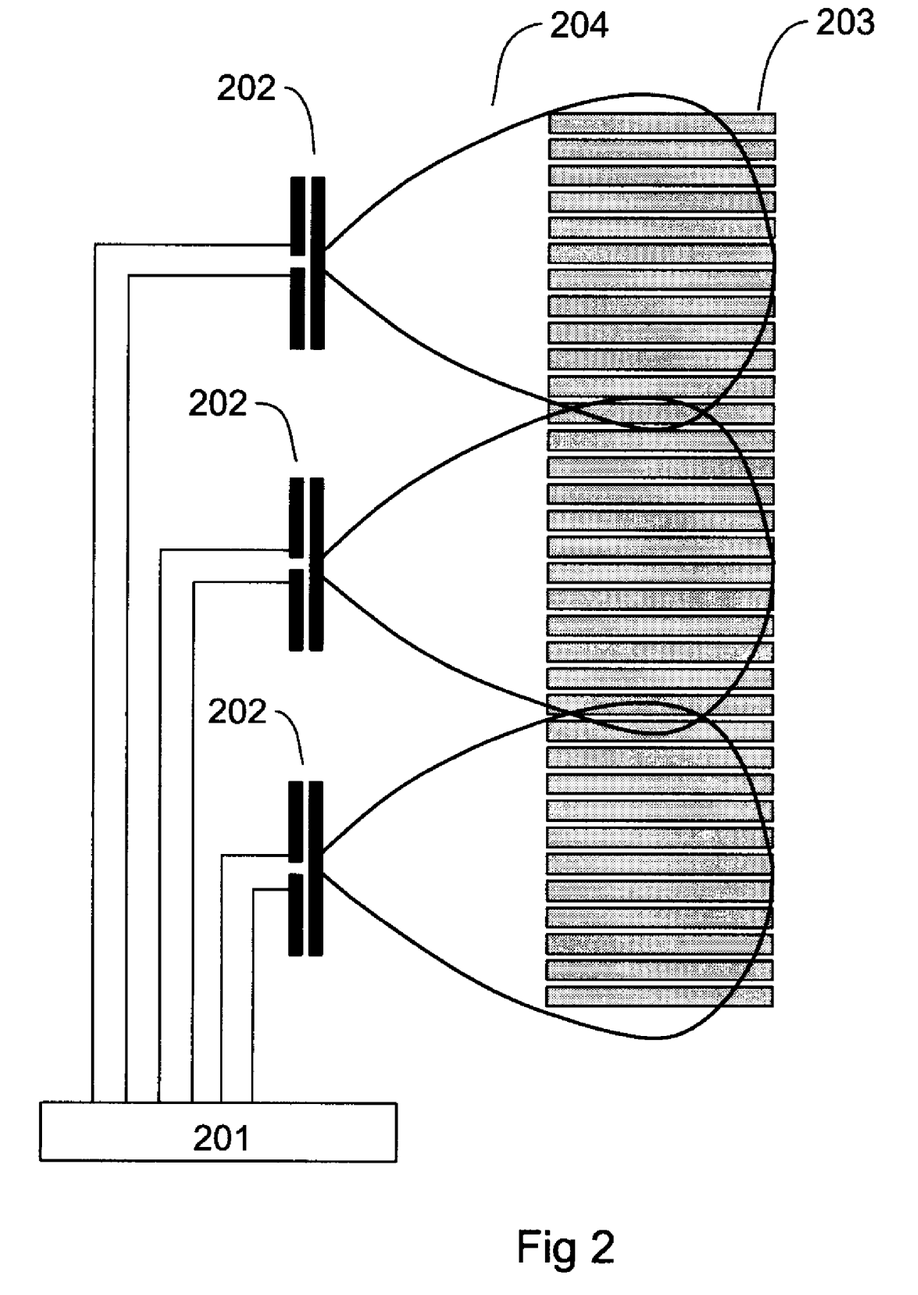
FIG. 2 shows the present invention implemented as an array of RFID antennae to identify items present on bookshelves.

FIG. 2 shows an implementation as an array of three RFID antennae (202) used to identify items (203) present on bookshelves, according to either the first or second embodiment.

Based on the length of the bookshelf, the number of items to be detected, the aperture of an antenna beam (204), etc., an appropriate number of RFID antennae can be determined. It will appear clearly later in the description, how the present invention can be used to build a cheap, flexible array of RFID antennae, with the desired number of antennae.

A control system (201) addresses each RFID antenna, generates a sensing signal to determine whether a particular item is in the vicinity of an antenna, and analyzes the signal in response to said sensing signal.

Figure 3:
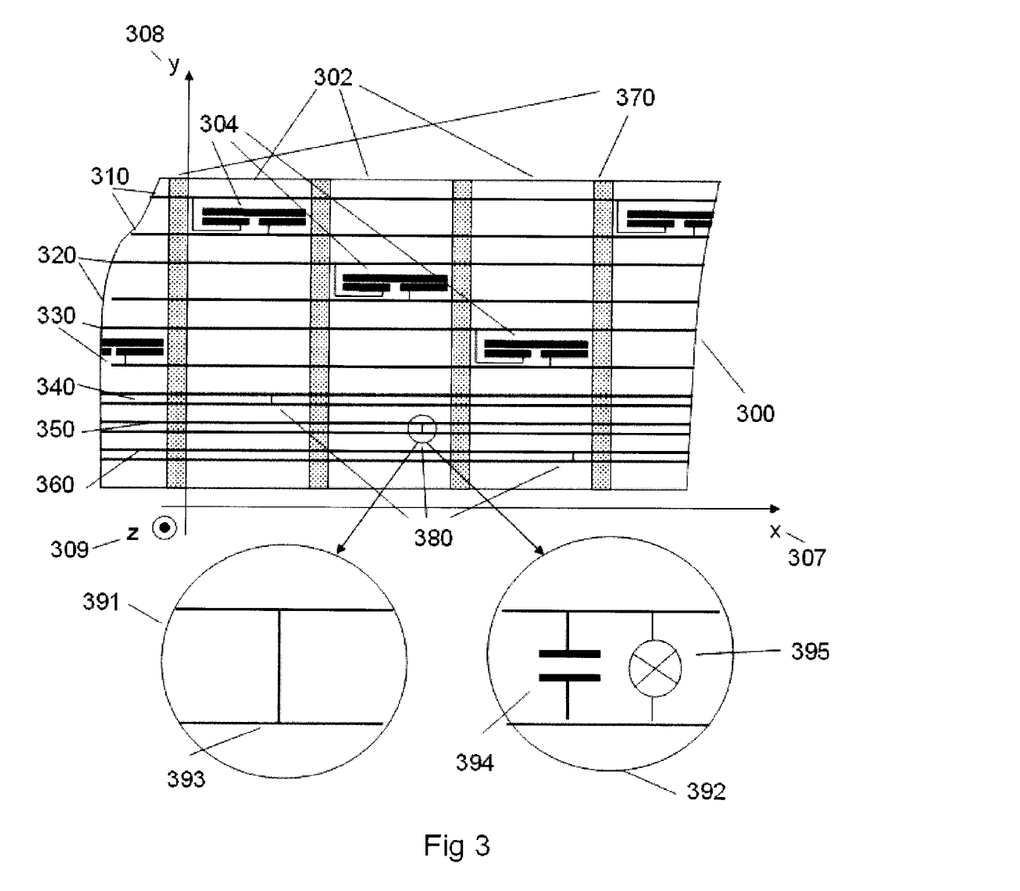
FIG. 3 shows an implementation as a ribbon of a web member of electronic components, along with two different variants of a status annunciator.

FIG. 3 shows an implementation as a ribbon of a web member (300) of three electronic components (302), along with two different variants—(391) and (392)—of a status annunciator (380), suitable for incorporating electronic components such as those described in the first embodiment, with respect to FIG. 1A.

Such an electronic component can be obtained for example using the ink on film technique, as disclosed for example in EP1250727.

In variant (391), status annunciator (380) is a simple short circuit (393). In variant (392), a capacitor (394) is in parallel with a LED (395). LED (395) can indicate visually that a transducer (304) that is also in electronic component (302) is in use. In a preferred embodiment, status annunciator (380) is kept as simple as possible, preferably a passive electric circuit.

Figure 4:
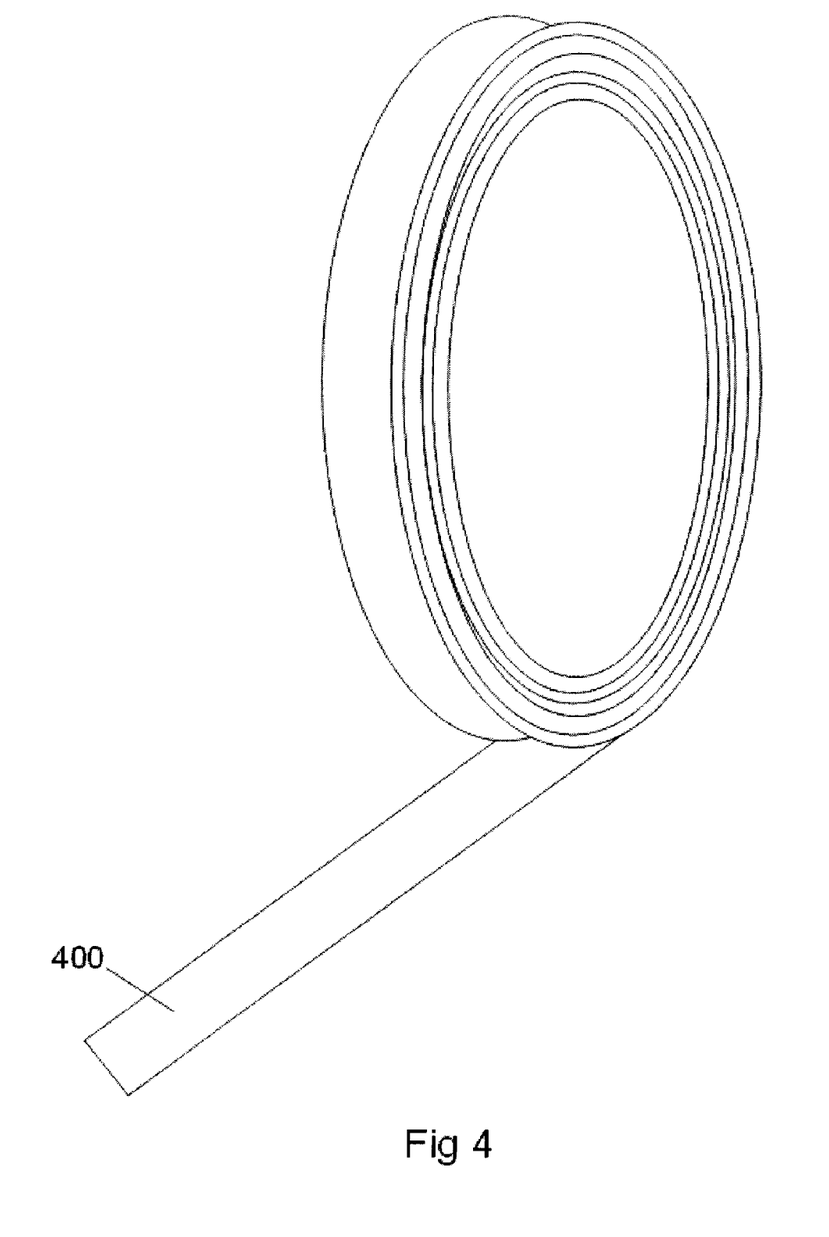
FIG. 4 shows a ribbon that can be manufactured.

FIG. 4 shows a ribbon that can be manufactured to implement the first embodiment. Electronic components are formed on a flexible printed circuit. When transducer (304) is an RFID antenna, pairs of conductors transmitting the differential signal to antennae have to be designed with the right physical shape depending on the characteristic impedance of the transmission line. Dipolar antennae dimensions are calculated in accordance with the frequency signal to be radiated.

The ribbon can be manufactured continuously and rolled up for delivery. Later on, the ribbon can be cut up to get a variable number of electronic components.

FIG. 5 shows a pluggable electronic component (500) suitable for incorporating electronic components such as those described in the second embodiment, along with two different variants (592), (595) of a status annunciator (580), similar to FIG. 3.

FIG. 6 shows a web member (600) of a pluggable identical electronic first component (500), a second component (610) and a third component (620), according to the second embodiment of the invention.

First circuit means (510) propagate signals to and from a transducer (511) of first electronic component (500) of web member (600).

Second circuit means (540) and (550) propagate signals to and from a status annunciator (580) of first electronic component (500) of web member (600).

Wires (520), part of third circuit means, extend the connection to a transducer (611) of the second electronic component (610) in web member (600).

Wires (530), part of third circuit means, extend the connection to a transducer (621) of third electronic component (620) in web member (600).

Wires (540) and (560), part of third circuit means, extend the connection to a status annunciator (680) of second electronic component (610) in web member (600).

Wires (540) and (570), part of third circuit means, extend the connection to status annunciator (681) of third electronic component (620) in web member (600).

FIG. 7 shows a pluggable electronic component that can be part of a web member of six identical electronic components, according to the second embodiment of the invention.

The principles are the same as those described with respect to FIG. 5. An electronic component (700) comprises:
- a transducer (701),
- a status annunciator (780),
- plugs (710), (711), (712), (713), (714), (715), (730), (731), (732), (733), (734), (735) and (736) and sockets (771), (772) and (773) as connection points, and
- circuit means to propagate signals between these components.

This implementation is said to be modulo 6 as web members of maximum six electronic components (700) can be obtained. It can be applied to electronic component (300) described with respect to FIG. 3.

FIGS. 8A and 8B show two web members (800) and (801) of electronic component implementations, cut from a ribbon at different locations, according to the first embodiment of the invention.

Even though cut at different locations, the connection points of two web members (800) and (801) correspond to the same components. Thus, circuit means (840) and (841) propagate signals to the status annunciator corresponding to the transducer that is accessible by top-most circuit means (810) and (811) in web members (800) and (801).

Likewise, (820) and (821) correspond respectively to (850) and (851), and (830) and (831) correspond to (860) and (861).

Figure 9A:
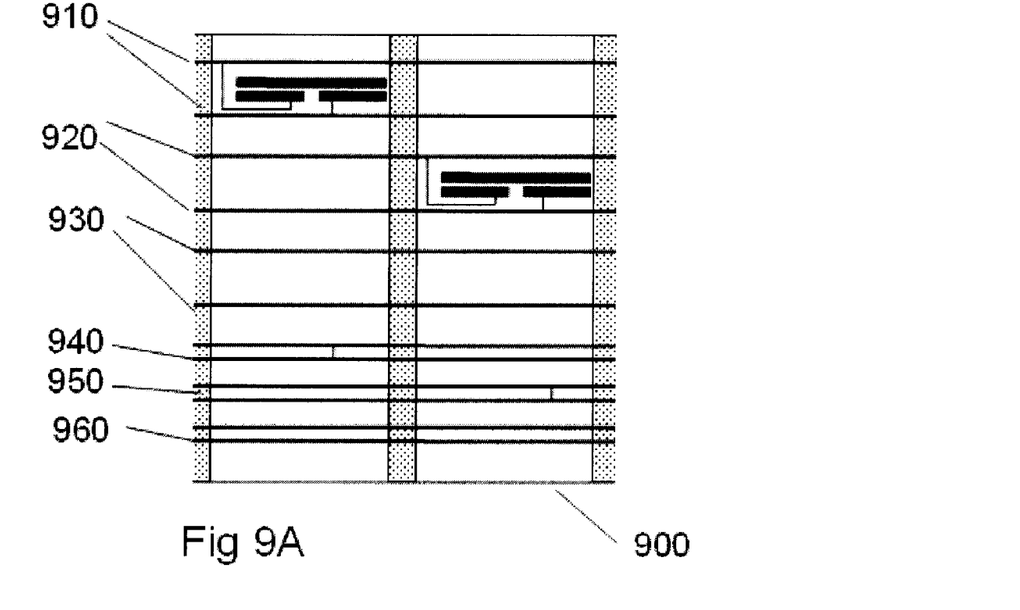
FIGS. 9A and 9B show two web members comprising two electronic components out of a maximum of three.
Figure 9B:
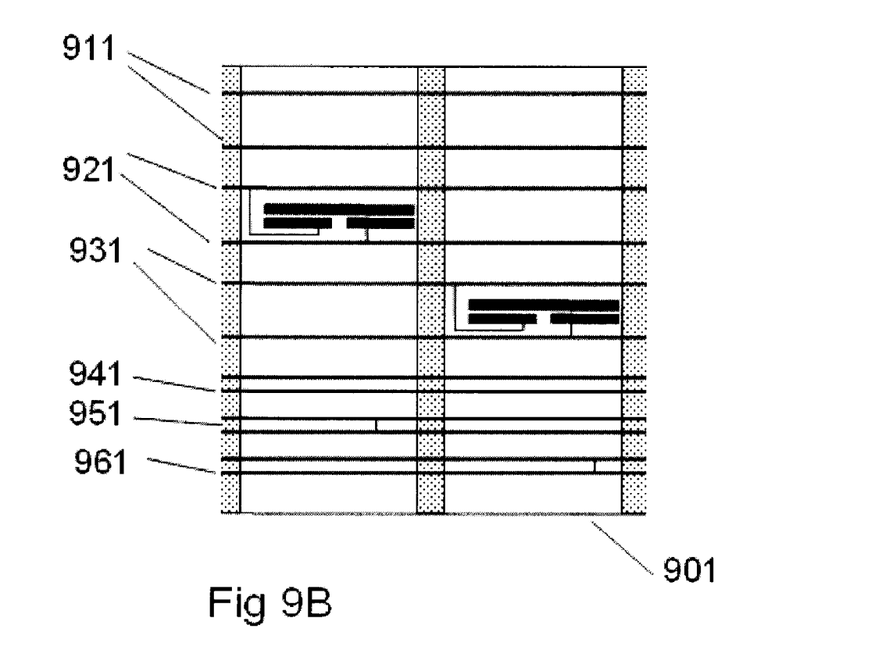

FIGS. 9A and 9B show two web members (900) and (901) comprising two electronic components out of a maximum of three, according to the first embodiment of the invention.

Although there are shown two electronic components out of a maximum of three, the number of connection points (910), (920), (930), (940), (950), (960) and (911), (921), (931), (941), (951), (961) remains the same. The role of the status annunciator is clearly to help the control system (as described with respect to FIGS. 1A and 1B) to identify at which connection points a transducer is present.

At connection points (960) and (941), the circuit is open, meaning that there is no transducer at the corresponding connection points, i.e. (930) and (911) respectively.

FIG. 10 shows a particular implementation of web members (1000) and (1001) of electronic components, adapted to extend the number of maximum transducers by combining two web members.

First web member (1000) comprises a modulo 3 sub web member (1021) as described with respect to FIG. 3 and a sub web member (1022) of the same length as sub web member (1021), that comprises means to propagate signals.

Second web member (1001) is similar to the first one, except that the sub web members are swapped.

Web member (1001) can be placed above web member (1000) to form a component (1010), a modulo 6 web member.

A third embodiment comprises:
- connectable electronic component (102a) or (112a), comprising transducer (304) or (511) such as an RFID antenna, status annunciator (380) or (580), such as a short circuit, to indicate the presence of the electronic component, and circuit means to propagate signals between the transducer, the status annunciator and external control system (110), and circuit means to propagate signals between the external control system and other electronic components (102b) and (112b), and
- control system (110) adapted to control an array of electronic components (103) or (113), comprising sensing means (111) adapted to generate an interrogation signal to detect the presence of any electronic component, a subsystem (115) adapted to generate a control signal to control the transducer of a detected electronic component, and routing means (114).

The invention can take the form of an entirely hardware embodiment, or an embodiment containing both hardware and software elements. In a preferred embodiment, the control system is implemented in software (which includes but is not limited to firmware, resident software, microcode, etc.), and hardware (which includes but is not limited to electronic chips, copper wires, sockets as connection points, etc.), and the electronic component is implemented in hardware (which includes but is not limited to film, copper wires, conductive ink, etc.).

Furthermore, the control system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the control system either directly or through intervening I/O controllers.

Network adapters may also be coupled to the control system to enable the data processing system to become coupled to other data processing systems or remote printers or storage devices through intervening private or public networks. Modems, cable modem and Ethernet cards are just a few of the currently available types of network adapters.

What is claimed is:

1. An apparatus, said apparatus comprising:
   a control system; and
   a ribbon web member directly connected physically and electrically to the control system at a plurality of connection points,
   wherein the ribbon web member comprises three electronic components,
   wherein the three electronic components consist of a first electronic component directly connected physically and electrically to the control system at the plurality of connection points, a second electronic component directly connected physically and electrically to the first electronic component at a first connection interface, and a third electronic component directly connected physically and electrically to the second electronic component at a second connection interface, said first connection interface and said second connection interface being located on opposite sides of the second electronic component, said opposite sides being parallel to each other, wherein the first electronic component is disposed between the control system and the second electronic component, wherein the second electronic component is disposed between the first electronic component and the third electronic component, wherein each electronic component comprises:
- a status enunciator configured to receive an interrogation signal transmitted from the control system and to respond to the interrogation signal by indicating a presence or absence of said each electronic component,
- a transducer configured to receive a control signal transmitted from the control system in response to the status enunciator having indicated said presence of said each electronic component,
- first circuit means for receiving the control signal transmitted by the control system and for subsequently propagating the control signal to the transducer to control the electronic component, and
- second circuit means for receiving the interrogation signal transmitted by the control system and for subsequently propagating the interrogation signal to the status enunciator.

2. The apparatus of claim 1, wherein the plurality of connection points comprise a first line of demarcation directly connecting physically and electrically the first electronic component to the control system, wherein the first connection interface comprises a second line of demarcation directly connecting physically and electrically the second electronic component to the first electronic component, and wherein the second connection interface comprises a third line of demarcation directly connecting physically and electrically the third electronic component to the second electronic component.

3. The apparatus of claim 1, wherein the plurality of connection points comprise first plugs and sockets directly connecting physically and electrically the first electronic component to the control system, wherein the first connection interface comprises second plugs and sockets directly connecting physically and electrically the second electronic component to the first electronic component, and wherein the second connection interface comprises third plugs and sockets directly connecting physically and electrically the third electronic component to the second electronic component.

4. The apparatus of claim 1, wherein the control system is configured to determine a total number of electronic components comprised by the ribbon web member.

5. The apparatus of claim 1, wherein the control system comprises:
- a subsystem configured to generate the control signal for each electronic component;
- a sensing component configured to generate the interrogation signal for each electronic component; and
- routing means for routing the control signal from the subsystem to the first circuit means of each electronic component and for routing the interrogation signal from the sensing component to the second circuit means of each electronic component, wherein the subsystem is coupled to the routing means, wherein the sensing component is coupled to the routing means, and wherein the subsystem is coupled to the sensing component.

6. The apparatus of claim 1, wherein the status enunciator of each electronic component is a short circuit.

7. The apparatus of claim 1, wherein the status enunciator of each electronic component is a capacitor connected electrically in parallel with a LED.

8. The apparatus of claim 1, wherein the transducer comprised by the first, second, and/or third electronic component is an actuator.

9. The apparatus of claim 1, wherein the transducer comprised by the first, second, and/or third electronic component is a sensor.

10. The apparatus of claim 1, wherein the transducer comprised by one electronic component of the first, second, and third electronic components is an actuator, and wherein the transducer comprised by another electronic component of the first, second, and third electronic components is a sensor.

11. The apparatus of claim 1, wherein the transducer comprised by the first, second, and/or third electronic component is a pH probe.

12. The apparatus of claim 1, wherein the transducer comprised by the first, second, and/or third electronic component is a electro-galvanic fuel cell.

13. The apparatus of claim 1, wherein the transducer comprised by the first, second, and/or third electronic component includes electro active polymers.

14. The apparatus of claim 1, wherein the transducer comprised by the first, second, and/or third electronic component is a linear motor.

15. The apparatus of claim 1, wherein the transducer comprised by the first, second, and/or third electronic component is a strain gauge.

16. The apparatus of claim 1, wherein the transducer comprised by the first, second, and/or third electronic component is a photomultiplier tube.

17. The apparatus of claim 1, wherein the transducer comprised by the first, second, and/or third electronic component is a hall effect sensor.

18. A method for forming an apparatus, said method comprising:
- forming the apparatus of claim 1, said forming comprising directly connecting physically and electrically the control system to the ribbon web member at the plurality of connection points.

19. A method for controlling an electronic component, said method comprising:
- providing an apparatus, said apparatus comprising:
  - a control system; and
  - a ribbon web member directly connected physically and electrically to the control system at a plurality of connection points,
  - wherein the ribbon web member comprises three electronic components,
  - wherein the three electronic components consist of a first electronic component directly connected physically and electrically to the control system at the plurality of connection points, a second electronic component directly connected physically and electrically to the first electronic component at a first connection interface, and a third electronic component directly connected physically and electrically to the second electronic component at a second connection interface, said first connection interface and said second connection interface being located on opposite sides of the second electronic component, said opposite sides being parallel to each other, wherein the first electronic component is disposed between the control system and the second electronic component, wherein the second electronic component is disposed between the first electronic component and the third electronic component, wherein each electronic component comprises:
- a status enunciator configured to receive an interrogation signal transmitted from the control system and to respond to the interrogation signal by indicating a presence or absence of said each electronic component,
- a transducer configured to receive a control signal transmitted from the control system in response to the status enunciator having indicated said presence of said each electronic component,
- first circuit means for receiving the control signal transmitted by the control system and for subsequently propagating the control signal to the transducer to control the electronic component, and
- second circuit means for receiving the interrogation signal transmitted by the control system and for subsequently propagating the interrogation signal to the status enunciator;

selecting the electronic component from the group consisting of the first electronic component, the second electronic component, and the third electronic component;

said control system generating the interrogation signal for the electronic component;

transmitting the interrogation signal from the control system to the status enunciator in the electronic component via the second circuit means in the electronic component;

ascertaining from a response of the status enunciator to the interrogation signal that the electronic component is present;

responsive to said ascertaining, said control system generating the control signal for the electronic component;

transmitting the control signal from the control system to the transducer in the electronic component to control the electronic component.

20. The method of claim 19, wherein the electronic component is the first electronic component, wherein the interrogation signal is a first interrogation signal, wherein the status enunciator in the first electronic component is a first status enunciator, wherein the status enunciator in the second electronic component is a second status enunciator, wherein the status enunciator in the third electronic component is a third status enunciator, wherein the control signal is a first control signal, and wherein the method comprises:

said control system generating a second interrogation signal for the second electronic component and a third interrogation signal for the third electronic component;

simultaneously transmitting the first interrogation signal, the second interrogation signal, and the third interrogation signal from the control system to the first status enunciator, the second status enunciator, and the third status enunciator, respectively;

ascertaining from a first response of the first status enunciator to the first interrogation signal, from a second response of the second status enunciator, and from a third response of the third status enunciator that the first electronic component is present, the second electronic component is present, and the third electronic component is present, respectively;

responsive to said ascertaining that the second electronic component is present, generating a second control signal for the second electronic component;

responsive to said ascertaining that the third electronic component is present, generating a third control signal for the third electronic component;

simultaneously transmitting the first control signal from the control system to the first transducer to control the first electronic component, the second control signal from the control system to the second transducer to control the second electronic component, and the third control signal from the control system to the third transducer to control the third electronic component.

* * * * *